United States Patent [19]
Asakura et al.

[11] Patent Number: 5,778,120
[45] Date of Patent: Jul. 7, 1998

[54] OPTICAL MODULE AND METHOD FOR MANUFACTURING THE OPTICAL MODULES

[75] Inventors: Hiroyuki Asakura, Osaka; Masanori Iida; Masaki Kobayashi, both of Neyagawa, all of Japan

[73] Assignee: Matsushita Electric Industrial Co., Ltd., Osaka, Japan

[21] Appl. No.: 642,480

[22] Filed: May 3, 1996

[30] Foreign Application Priority Data

May 12, 1995 [JP] Japan ..................................... 7-114902

[51] Int. Cl.[6] .................................................. G02B 6/30
[52] U.S. Cl. .............................. 385/49; 385/88; 385/89; 385/83; 385/14
[58] Field of Search ........................... 385/49–50, 14, 385/65, 83, 88–94

[56] References Cited

U.S. PATENT DOCUMENTS

| | | | |
|---|---|---|---|
| 4,639,074 | 1/1987 | Murphy | 385/49 |
| 4,904,036 | 2/1990 | Blonder | 385/14 |
| 5,297,228 | 3/1994 | Yanagawa et al. | 385/49 X |
| 5,559,914 | 9/1996 | Asakura | 385/49 |
| 5,596,662 | 1/1997 | Boscher | 385/65 X |

*Primary Examiner*—Rodney B. Bovernick
*Assistant Examiner*—Hemang Sanghavi
*Attorney, Agent, or Firm*—Merchant, Gould, Smith, Edell, Welter & Schmidt, P.A.

[57] ABSTRACT

In an optical module such as an optical branching and multiplexing device used in an optical communication system, optical waveguides are formed on a surface of an optical waveguide substrate and optical fibers are held by arranging guide grooves on an optical fiber arranging substrate. The optical waveguide substrate has positioning guide grooves which can engage with the arranging guide grooves. The pitch of the optical waveguides on end faces of the optical waveguide substrate coincide with the pitch of the arranging guide grooves, so that the optical fibers and the optical waveguides are coupled accurately without any adjustment.

22 Claims, 9 Drawing Sheets

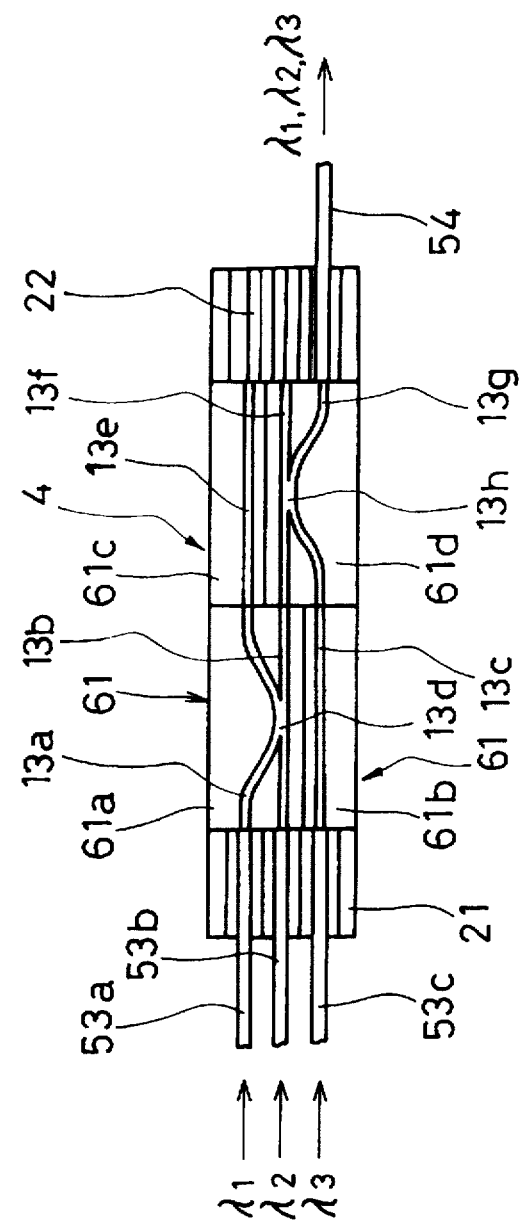

OPTICAL MODULE AND METHOD FOR MANUFACTURING THE OPTICAL MODULES

BACKGROUND OF THE INVENTION

This invention relates to an optical module used in an optical communication system and relates to a method for manufacturing the optical module.

DESCRIPTION OF THE PRIOR ART

The optical communication system is applied and practically used in a public communication, cable television (CATV), computer network, and the like. To increase the use of the optical communication system, downsizing, multiple function, integration and low cost of the optical modules are required, especially in subscriber's loop optical communication system. A first conventional optical module, such as an optical transceiver, which is used in the optical communication system, is configured with a semiconductor laser serving as a light emitting device, a laser driving circuit, a photodiode serving as a light sensing device, a demodulator circuit, optical fibers and so on. The optical elements and electric elements need to be assembled, adjusted and mounted, accurately. The conventional optical device needs many elements and assembling processes.

On the other hand, in the subscriber's loop optical communication system, the functions of optical wavelength division multiplexing transmission and two way transmission, which use wide band optical communication, are demanded. For realizing the demands, an integrated and downsized conventional second optical module, on which optical waveguides are formed, is proposed. For example, optical waveguides made of quartz and having desired characteristics are formed on a silicon substrate using a flame deposition method. The silicon substrate has a distribution of metal electrodes and V-shaped grooves. Semiconductor devices are mounted on the metal electrodes for forming an electric circuit, and optical fibers are arranged on the V-shaped grooves for coupling to the semiconductor devices. The second conventional optical module is comprised of an optical waveguide substrate and a groove substrate. The optical waveguide substrate has optical waveguides, a light emitting device, a photodiode, metal electrodes, and so on. The groove substrate has grooves for holding the optical fibers. The optical waveguide substrate and the groove substrate are separated. In order to reduce the loss of the light when the optical waveguide substrate and the optical fibers are connected, the optical module must be adjusted, assembled and fixed within an error of 1 μm.

In the above-mentioned conventional optical modules, the V-shaped grooves for holding the optical fibers are formed by etching the silicon substrate according to a predetermined pattern. Alternatively, the V-shaped grooves are formed by directly cutting the ceramic substrate along predetermined lines. Consequently, there may be problems in the direct cutting of the ceramic substrate in that the working accuracy of the grooves is poor and the productivity of the substrates is not so high. On the other hand, the V-shaped grooves having high working accuracy can be formed on the silicon substrate by the etching method because of its dependency on crystalline structure. However, the shape of the groove is restricted to a V-shape, so that the option of the optical fibers which can be mounted on the groove is narrower. When the materials of the optical waveguide and the groove substrate are different from each other, the optical module is weak under the temperature changes. The optical module will be damaged by cracks of the optical waveguide, the groove substrate or an adhesive for binding them due to the difference between the coefficients of thermal expansion of the materials. When the semiconductor devices and electric parts are mounted on the silicon substrate, an insulative layer must be formed on the silicon substrate. Even when the semiconductor devices are directly formed on the silicon substrate, the optical waveguide occupies a large area, so that the number of modules obtained from one wafer is small. Thus, the semiconductor process cannot be effected in the cost of the optical modules.

SUMMARY OF THE INVENTION

Purposes of this invention are to provide an optical module with optical waveguides by which the optical fibers and/or semiconductor devices can be coupled with the optical waveguides precisely and firmly, and to provide a method for manufacturing the optical modules.

A first configuration of an optical module of this invention comprises an optical waveguide substrate with optical waveguides formed on a first surface thereof and at least one positioning guide groove formed on a second surface opposing the first surface, and an optical fiber arranging substrate having arranging guide grooves formed on a surface thereof and engaged with the positioning guide groove of the optical waveguide substrate for arranging and holding optical fibers, wherein the pitch of the optical waveguides on end faces of the optical waveguide substrate with which the optical fibers are coupled coincides with the pitch of the arranging guide grooves of the optical fiber arranging substrate.

In the above-mentioned first configuration, the optical waveguides are formed on, for example, a top surface of the optical waveguide substrate, and the positioning guide groove(s) is(are) formed on, for example, a bottom surface of the optical waveguide substrate. When the positioning guide groove(s) is(are) engaged with the arranging guide grooves of the optical fiber arranging substrate, the position of the optical waveguide substrate on the optical fiber arranging substrate can easily be fixed. The arranging guide grooves serve as guide means for arranging and holding the optical fibers on the optical fiber arranging substrate. Thus, the optical fibers are automatically positioned for facing the optical waveguides, and the optical fibers are coupled with the optical waveguides. As a result, the adjustment process of the positions of the optical fibers against the optical waveguides, which was needed in the assembly of the conventional optical modules, can be omitted. The optical module of this invention can easily be assembled. The productivity in manufacturing the optical modules of this invention can be increased.

In the first configuration, it is preferable that the positioning guide grooves of the optical waveguide substrate and the arranging guide grooves of the optical fiber arranging substrate respectively have cross-sections of the same alternating periodic pattern, and the phase of the periodic pattern of the positioning guide groove is ½ pitch different from that of the arranging guide grooves. By such a configuration, the convex portions of the positioning guide grooves of the optical waveguide substrate are engaged with the concave portions of the arranging guide grooves of the optical fiber arranging substrate, and vice versa. Thus, the optical waveguide substrate and the optical fiber arranging substrate contact on a plurality of faces, and are firmly fixed in a direction parallel to the arranging guide grooves. The positioning accuracy of the optical waveguide substrate and the optical fiber arranging substrate in the direction parallel to the arrangement of the guide grooves becomes very high.

Furthermore, it is preferable that the alternating shape of the positioning guide grooves and the arranging guide grooves are selected to be substantially V-shaped, arcuate or rectangular. By such a configuration, the positioning guide grooves and the arranging guide grooves can easily be formed by machine work, so that the working accuracy of the guide grooves can be increased.

A second configuration of an optical module of this invention comprises an optical waveguide substrate, at least one optical fiber and an optical fiber arranging substrate having at least one arranging guide groove for arranging and holding the optical fiber, wherein at least one positioning guide groove is formed on the optical waveguide substrate by which the optical waveguide substrate is positioned on the optical fiber arranging substrate. By such a configuration, when the positioning groove(s) of the optical waveguide substrate is(are) engaged with the arranging guide grooves of the optical fiber arranging substrate, the position of the optical waveguide substrate can be fixed on the optical fiber arranging substrate in a direction perpendicular to the axes of the optical fibers.

A third configuration of an optical module of this invention comprises an optical waveguide substrate, at least one optical fiber, at least one electric element and an optical fiber arranging substrate having at least one arranging guide groove for arranging and holding the optical fiber, wherein at least one positioning guide groove is formed on the optical waveguide substrate by which the optical waveguide substrate is positioned on the optical fiber arranging substrate, and at least one positioning mark, by which the electric element is mounted, is formed on at least one of the optical waveguide substrate and the optical fiber arranging substrate.

By the above-mentioned third configuration, when the positioning groove(s) is(are) engaged with the arranging guide grooves of the optical fiber arranging substrate, the position of the optical waveguide substrate on the optical fiber arranging substrate can easily be fixed. Furthermore, the electric elements such as a light emitting device, a photosensor, the wiring for the electrodes, an electric circuit, a semiconductor device, an integrated circuit (IC), a large scale integrated circuit (LSI) can be mounted on the optical module, integrally. Furthermore, the electric elements to be mounted on the optical waveguide substrate can be positioned precisely by the positioning mark(s).

In the third configuration, it is preferable that the optical fiber arranging substrate has a mounting surface, on which the electric element is mounted, on the same side of the arranging guide grooves, and the positioning mark(s) is(are) selected to have a convex structure, a concave structure, or a combination of convex and concave structures against the mounting surface. By such a configuration, the arranging guide grooves for arranging and holding the optical fibers and the positioning mark(s) can be formed at the same time using a die. Thus, the working of the optical fiber arranging substrate can be made easier. The positioning accuracy of the positioning mark(s) relative to the arranging guide grooves becomes higher.

In the second or third configuration, it is preferable that the optical waveguide substrate is divided into portions of two or more, and a pattern of the optical waveguides in at least one portion is different from that of the other. The pattern of the optical waveguides can be designed for serving as an optical branching device, an optical multiplexer, and the like. By combining the patterns of the optical waveguides optionally, an optical module having desired functions can be obtained.

Alternatively, in the second or third configuration, it is preferable that the optical waveguide substrate is divided into portions of two or more, a pattern of the optical waveguides in at least two of the portions being substantially the same, and the portions having the same pattern of the optical waveguides being respectively connected in different direction. With respect to the design of the pattern of the optical waveguides, a plurality of optical waveguides, which are arranged at a predetermined pitch, can be branched or functioned symmetrically. When the direction of a divided portion of the optical waveguide substrate is opposed to the direction of another divided portion, a multifunctional optical module can be obtained using only one kind of optical waveguide substrate.

Furthermore, it is preferable that at least one of the divided portions of the optical waveguide substrate has a coupling part for coupling at least two optical waveguides. Thus, the optical module can be used as an optical branching and multiplexing device in the optical communication system.

In the second or third configuration, it is preferable that the pitch of the optical waveguides on end faces of the optical waveguide substrate with which the optical fibers are coupled coincides with the pitch of the arranging guide grooves of the optical fiber arranging substrate. Thus, the optical waveguides and the optical fibers are automatically positioned and coupled when the positioning groove(s) of the optical waveguide substrate is(are) engaged with the arranging guide grooves of the optical fiber arranging substrate and the optical fibers are arranged and held on the arranging guide grooves.

In a method for manufacturing the optical modules of this invention, at least one positioning groove is formed on a first surface of an optical waveguide substrate; optical waveguides for effecting predetermined functions are formed on a second surface opposing the first surface of the optical waveguide substrate; arranging guide grooves, with which the positioning groove of the optical waveguide substrate is engaged and on which optical fibers are arranged and held, are formed on a surface of an optical fiber arranging substrate; and the optical waveguide substrate is fixed on the optical fiber arranging substrate; wherein the pitch of the optical waveguides on end faces of the optical waveguide substrate with which the optical fibers are coupled coincides with the pitch of the arranging guide grooves of the optical fiber arranging substrate. Thus, the optical module having a high positioning accuracy in a direction parallel to the arrangement of the guide grooves can be obtained.

In the above-mentioned method, it is preferable that the positioning groove of the optical waveguide substrate and the arranging guide grooves of the optical fiber arranging substrate are respectively formed by a die. Thus, the substrates having high reproducability and dimensional accuracy can be obtained. Especially, it is preferable that the positioning grooves of the optical waveguide substrate and the arranging guide grooves of the optical fiber arranging substrate are respectively formed by the same die. Thus, the engagement between the positioning groove(s) and the arranging guide grooves can be made more precisely and firmly. Furthermore, it is preferable that the optical waveguide substrate and the optical fiber arranging substrate are cut from the same substrate formed by a die. Thus, the engagement between the positioning groove(s) and the arranging guide grooves can be made even more precisely and firmly. Furthermore, the working process of the substrates and the number of elements constituting the optical module can be reduced.

Furthermore, it is preferable that the optical waveguides are formed to have grooves of a predetermined pattern on a surface of the optical waveguide substrate by a die, and that a transparent substrate made of glass or resin is directly attached using heat treatment, or bonded by adhesive, to the optical waveguide substrate. Thus, optical waveguides can be formed on the surface of the optical waveguide substrate.

Alternatively, the optical waveguides and the positioning groove are formed by dies at the same time. Thus, not only the optical waveguides can be formed without using a cutting process, but also the relative positioning accuracy between the optical waveguides and the optical fibers can be increased.

Alternatively, the optical waveguides are directly formed on a surface of the optical waveguide substrate by a method selected from ion exchange, flame deposition, chemical vapor deposition and sol-gel transformation. Thus, the optical waveguides can easily be formed on the surface of the optical waveguide substrate directly.

Furthermore, it is preferable that the optical waveguide substrate and the optical fiber arranging substrate are fixed using thermosetting resin adhesive, ultraviolet light curing resin, solder or low melting point glass. Thus, the optical waveguide substrate and the optical fiber arranging substrate can be fixed firmly. Furthermore, the heat expansion coefficients of these adhesive materials are similar to that of the substrate materials, so that breakage of the optical module due to the difference between the heat expansion coefficients can be prevented.

It is preferable that at least one positioning mark which is used for mounting at least one electric element is formed on at least one of the optical waveguide substrate and the optical fiber arranging substrate. Thus, the electric elements such as a light emitting device, a laser diode, a photodiode, a pattern of electrodes, an electric circuit, a semiconductor device, an integrated circuit (IC), a large scale integrated circuit (LSI) can be mounted on the optical module, integrally. Furthermore, the electric elements to be mounted on the optical waveguide substrate can be positioned precisely by the positioning mark(s).

Furthermore, it is preferable that the positioning mark is formed by a die, and the positioning mark is selected to have a convex structure, a concave structure, or a combination of convex and concave structures against a surface on which electric elements are mounted. Thus, the arranging guide grooves and the positioning mark(s) can be formed by a die at the same time. The working of the optical fiber arranging substrate can be made easier. The relative positioning accuracy of the positioning mark(s) to the arranging guide grooves becomes higher.

Furthermore, it is preferable that the optical waveguide substrate is divided into portions of two or more, and a pattern of the optical waveguides in at least one portion is different from that of the other. The pattern of the optical waveguides can be designed for serving as an optical branching filter, an optical multiplexer, and the like. By combining the patterns of the optical waveguides optionally, an optical module having desired functions can be obtained.

Alternatively, it is preferable that the optical waveguide substrate is divided into portions of two or more, patterns of the optical waveguides in at least two of the portions being substantially the same, and the portions being respectively connected in different direction. With respect to the design of the pattern of the optical waveguides, a plurality of optical waveguides, which are arranged at a predetermined pitch, can be branched or junctioned symmetrically. When the direction of a divided portion of the optical waveguide substrate is opposed to the direction of another divided portion, multifunctional optical module can be obtained using only one kind of optical waveguide substrate.

Furthermore, it is preferable that at least one of the divided portions of the optical waveguide substrate has a coupling part for coupling at least two optical waveguides. Thus, the optical module can be used as an optical branching and multiplexing device in the optical communication system.

Furthermore, it is preferable that the pitch of the optical waveguides on end faces of the optical waveguide substrate with which the optical fibers are coupled coincides with the pitch of the arranging guide grooves of the optical fiber arranging substrate. Thus, the optical waveguides and the optical fibers are automatically positioned and coupled when the positioning groove(s) of the optical waveguide substrate is(are) engaged with the arranging guide grooves of the optical fiber arranging substrate and the optical fibers are arranged and held on the arranging guide grooves.

BRIEF DESCRIPTION OF THE DRAWINGS

FIG. 9 is a plan view showing a finished optical module of a fourth embodiment of an optical module and method for manufacturing the optical modules of this invention.

DETAILED DESCRIPTION OF THE INVENTION

First Embodiment

Figure 1:
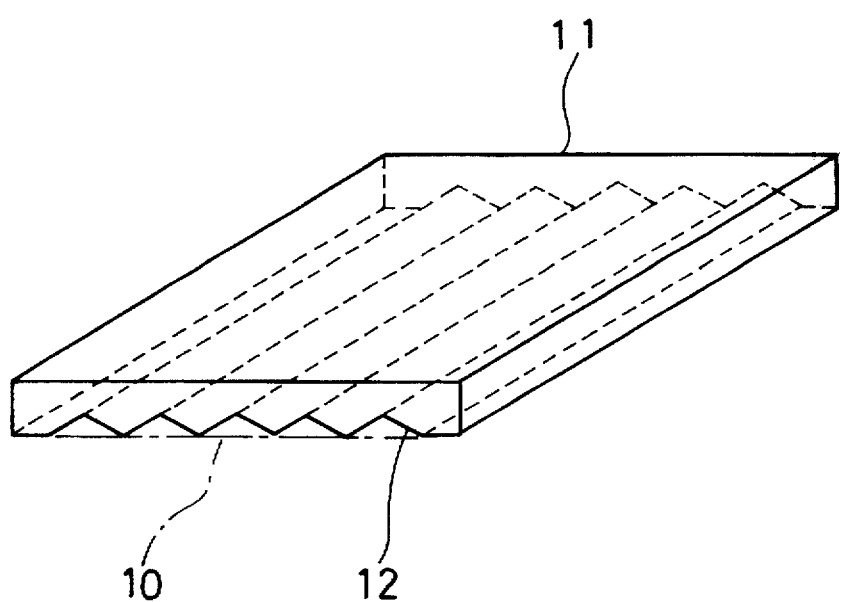
FIG. 1 is a perspective view showing a configuration of a base material for an optical waveguide substrate which is to be used in a first embodiment of an optical module and method for manufacturing the optical modules of this invention.
Figure 2:
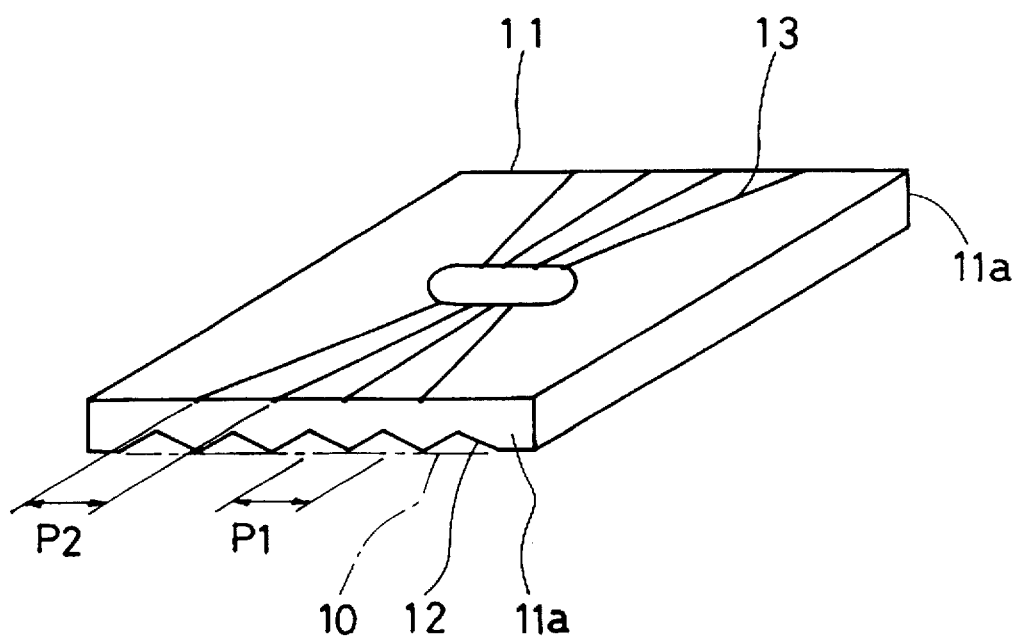
FIG. 2 is a perspective view showing a configuration of the optical waveguide substrate used in the first embodiment, on which optical waveguides are formed.
Figure 3:
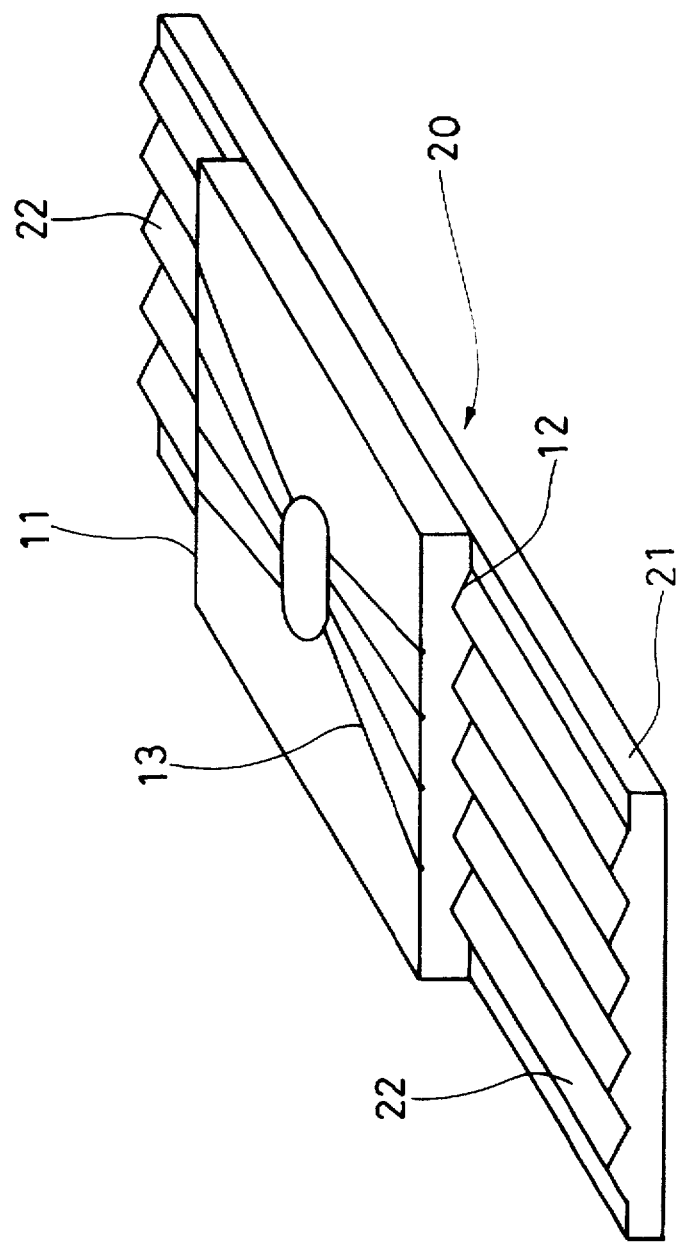
FIG. 3 is a perspective view showing an intermediate body in the first embodiment, in which the optical waveguide substrate is disposed on an optical fiber arranging substrate.

A first preferred embodiment of an optical module and a method for manufacturing the optical devices of this invention is described with reference to FIGS. 1 to 5. FIGS. 1 to 3 are respectively perspective views showing the steps for manufacturing the optical module. As shown in FIG. 1, positioning grooves 12 are formed on a surface, for example, a bottom surface of a base member 10 for an optical waveguide substrate 11, by using a die (not shown in the figure). The base member 10 for the optical waveguide substrate 11 is made of transparent resin or glass. As shown in FIG. 2, optical waveguides 13, which are designed for effecting predetermined functions, are formed on another surface, for example, a top surface of the base member for the optical waveguide substrate 11.

The optical waveguides 13 are formed by a process where a predetermined pattern of grooves is formed on the top surface of the base member 10 by using a die, and a transparent plate made of resin or glass (which is omitted in the figures for clearly showing the optical waveguides 13) is fixed on the top surface of the base member 10 by heat treatment or by adhesive.

Alternatively, the optical waveguides 13 are directly formed on the top surface of the base member 10 by an ion exchange method, a flame deposition method, a chemical vapor deposition (CVD) method, or a sol-gel method. In the ion exchange method, three-dimensional optical waveguides 13 are formed by exchanging ions in predetermined regions of the base member 10 which is made of glass. In the flame deposition method, quartz glass is depositted on the base member 10 by using an oxygen-hydrogen burner. In the CVD method, gas material is activated and decomposed, so that thin film can be formed on the surface of the base member 10. In the sol-gel method, sol-liquid, which is hydrolyzed of siliconalkoxyde contained in the glass material of the base member 10, is gelatinized.

Especially, by a method using a die, the grooves for the optical waveguides 13 and the positioning grooves 12 can be formed precisely in the same process, thus, producing an optical waveguide substrate 11 having positioning guide grooves 12 on the bottom surface and the optical waveguides 13 on the top surface. As can be seen from FIG. 2, the pitch P1 of the positioning guide grooves 12 and the pitch P2 of the optical waveguides 13 on the end faces 11a of the optical waveguide substrate 11 coincide with each other. In FIG. 2, the pattern of the optical waveguides 13 is formed for coupling four inputs to four outputs, which is called a star coupler. However, the pattern of the optical waveguides 13 is not restricted as shown in the figure, and other patterns may be used.

Next, as shown in FIG. 3, the optical waveguide substrate 13 is fixed on an optical fiber arranging substrate 21. An intermediate stage 20 of the optical module is thus formed. Arranging guide grooves 22, which are engaged with the positioning guide grooves 13 of the optical waveguide substrate 11 and which are used for positioning the optical fibers (not shown in FIG. 3) against the optical waveguides 13 accurately, are formed on a top surface the optical fiber arranging substrate 21. The arranging guide grooves 22 are preferably formed by using a die. Generally, when the grooves are formed by the die, the grooves are reproducable, and the substrate with the grooves can be manufactured. Thus, the cost for producing the substrate can be reduced. Different methods for fixing the optical waveguide substrate 11 and the optical fiber arranging substrate 21 may be used, including resin adhesion using thermosetting resin or ultraviolet light curing resin, solderring, or the adhesion of low melting point glass.

Figure 4:
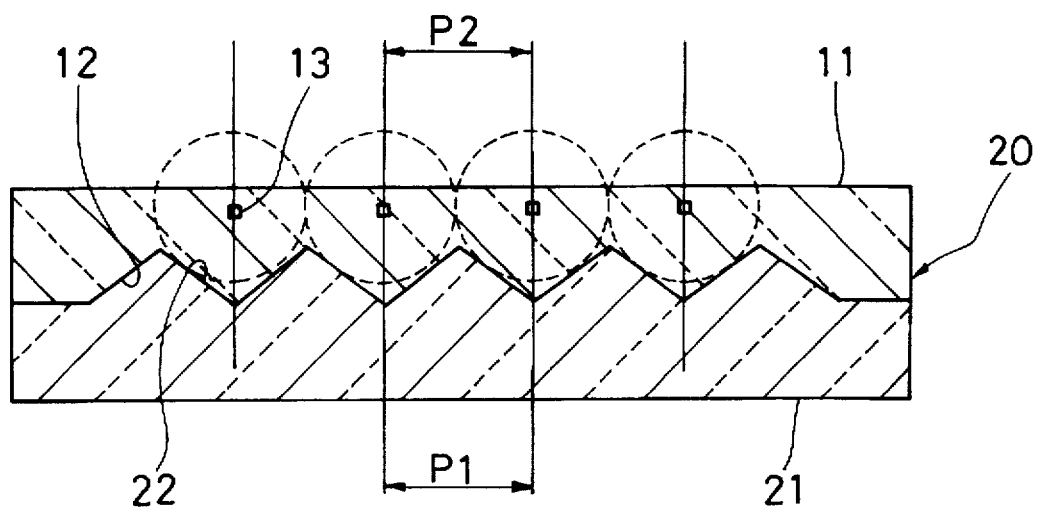
FIG. 4 is a cross-sectional view of the intermediate body shown in FIG. 3 in a direction perpendicular to axes of optical fibers to be held on the arranging guide grooves of the optical fiber arranging substrate in the first embodiment.
Figure 5:
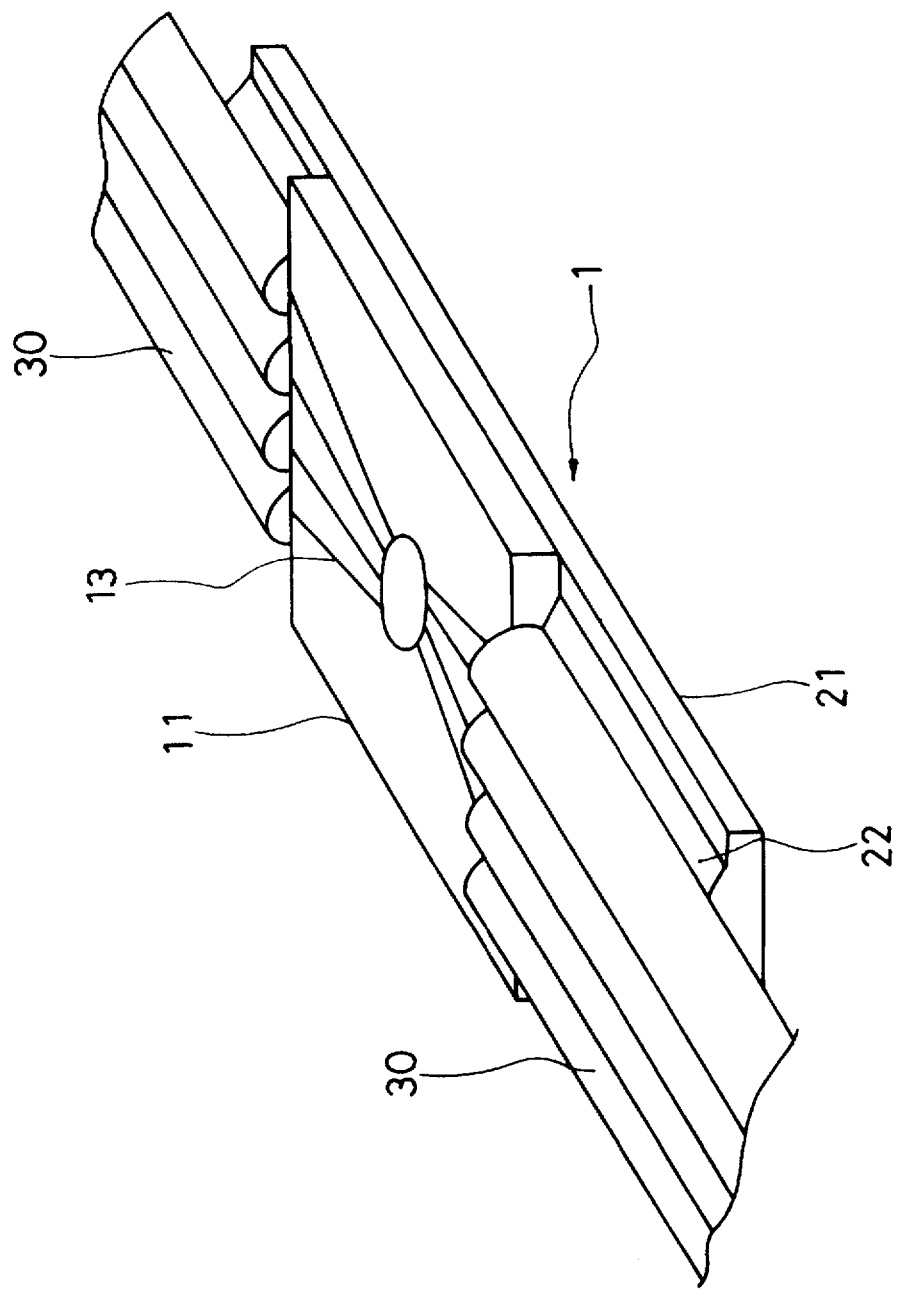
FIG. 5 is a perspective view showing a finished optical module of the first embodiment.

FIG. 4 shows a cross-sectional view of the intermediate stage 20, shown in FIG. 3, in a direction perpendicular to the axes of the optical fibers which are to be arranged on the arranging guide grooves. FIG. 5 shows a finished optical module 1 in the first embodiment, in which the optical fibers 30 are arranged and held on the arranging guide grooves 22.

As can be seen from FIG. 4, the positioning guide grooves 12 on the bottom surface of the optical waveguide substrate 11 and the arranging guide grooves 22 on the top surface of the optical fiber arranging substrate 21 respectively have cross-sections of a periodic V-shape. The phase of the periodic V-shape of the positioning guide grooves 12 is different by ½ pitch from that of the arranging guide grooves 22, so that the convex portions of the positioning guide grooves 12 engage with the concave portions of the arranging guide grooves 22, and vice versa. Thus, the optical waveguide substrate 11 and the optical fiber arranging substrate 21 are firmly engaged with each other without gap in the direction parallel to the arrangement of the guide grooves 12, 22. However, the cross-sectional shapes of the positioning guide grooves 12 and the arranging guide grooves 22 are not restricted to the shape shown in the figure. It is possible to form a periodic arcuate shape or rectangular shape corresponding to the characteristics of the adhesive used for fixing the substrates 11 and 21, when the positioning guide grooves 12 can be engaged with the arranging guide grooves 22. Furthermore, it is acceptable to make a gap between the convex portions of the positioning guide grooves 12 and the concave portions of the arranging guide grooves 22, and vice versa, when the substrates 11 and 21 can be fixed firmly.

As mentioned above, when the positioning guide grooves 12 are formed on the optical waveguide substrate 11 with the same pitch of the optical waveguides 13 and the optical fiber arranging guide grooves 22, the optical fibers 30 and the optical waveguides 13 can be precisely positioned and coupled without any adjustment. Furthermore, when the positioning guide grooves 12 of the optical waveguide substrate 11 and the arranging guide grooves 22 of the optical fiber arranging substrate 21 are formed by using the same die, the variation in the position and dimensions of the grooves 12 and 22 can be reduced. Furthermore, it is preferable that the optical waveguide substrate 11 and the optical fiber arranging substrate 21 can be cut from the same base member which is formed to be much longer than the length of the optical fiber arranging substrate 21. When the optical fiber arranging substrate 21 is cut in a predetermined length from the base member, the remainder can be used as a base member 10 for the optical waveguide substrate 11. In the latter case, the optical waveguide substrate 11 and the optical fiber arranging substrates 21 can be formed by substantially the same die.

Second Embodiment

A second preferred embodiment of an optical module and a method for manufacturing the optical modules of this invention is described with reference to FIGS. 6 and 7. Elements shown in FIGS. 6 and 7 which are designated by the same numerals in the above-mentioned first embodiments are substantially the same, and a repeated explanation of them is omitted.

In the second embodiment shown in FIGS. 6 and 7, an optical fiber and electric elements mounting substrate 31 (hereinafter, abbreviated as mounting substrate 31) is used instead of the optical fiber arranging substrate 21 in the first embodiment.

Figure 6:
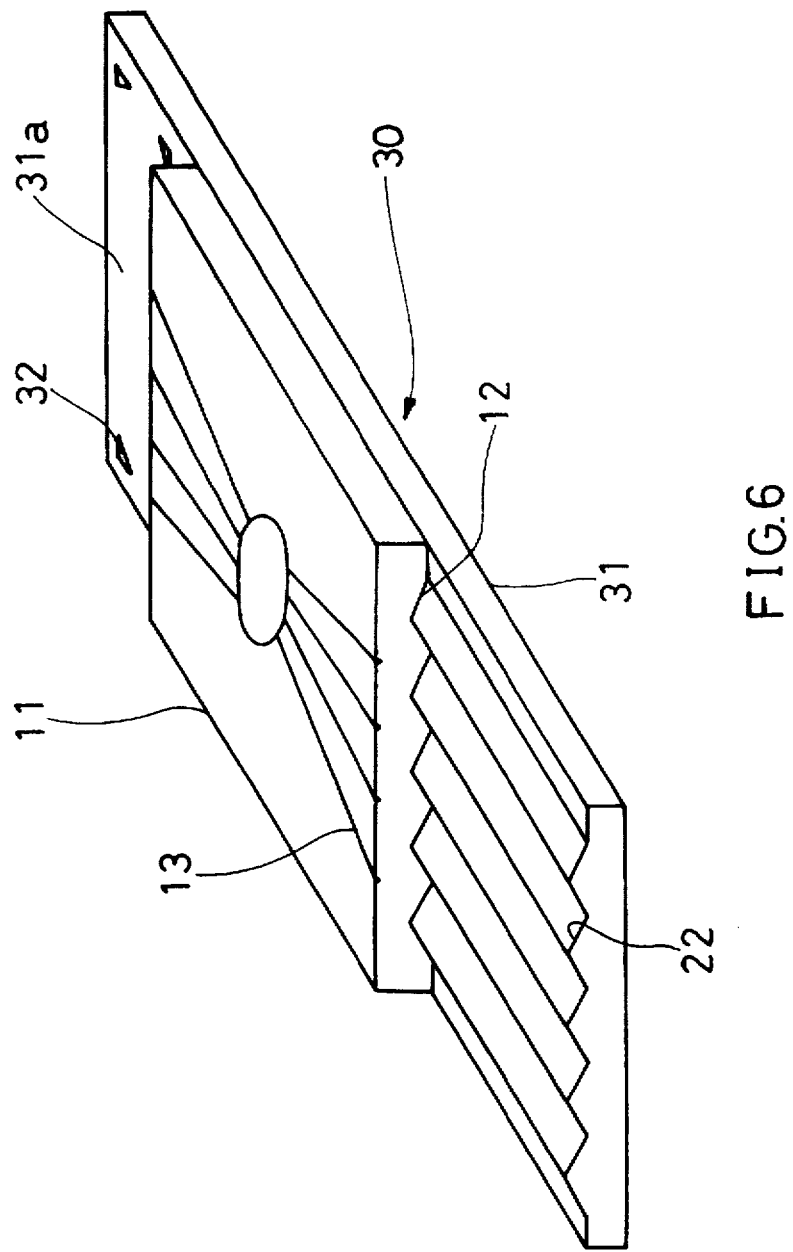
FIG. 6 is a perspective view showing an intermediate body in a second embodiment of an optical module and method for manufacturing the optical modules of this invention, in which an optical waveguide substrate is disposed on an optical fiber arranging substrate.

As can be seen from FIG. 6 which shows an intermediate stage 30 of the optical module in the second embodiment, the mounting substrate 31 has the arranging guide grooves 22 and an electric elements mounting surface 31a on the same side (upper surface). The optical waveguide substrate 11 is fixed on the mounting substrate 31 by engaging the positioning guide grooves 12 with the arranging guide grooves 22. When the mounting substrate 31 is formed, positioning marks 32 are marked on the electric elements mounting surface 31a a part of the process of forming the arranging guide grooves 22. The positioning marks 32 are used for mounting the electric elements such as a light emitting device, a laser diode, a photodiode, a wiring pattern of electrodes, an electric circuit, a semiconductor device, an integrated circuit (IC), a large scale integrated circuit (LSI), and the like on the electric elements mounting surface 31a. The positioning marks 32 has a shape which is selected to be convex, concave or combination of convex and concave on the electric elements mounting surface 31a. By using the positioning marks 32, the electric elements are accurately positioned against the optical waveguides 13 of the optical waveguide substrate 11. These marks can be available for forming stud-bumps which are used for electrical bonding.

Figure 7:
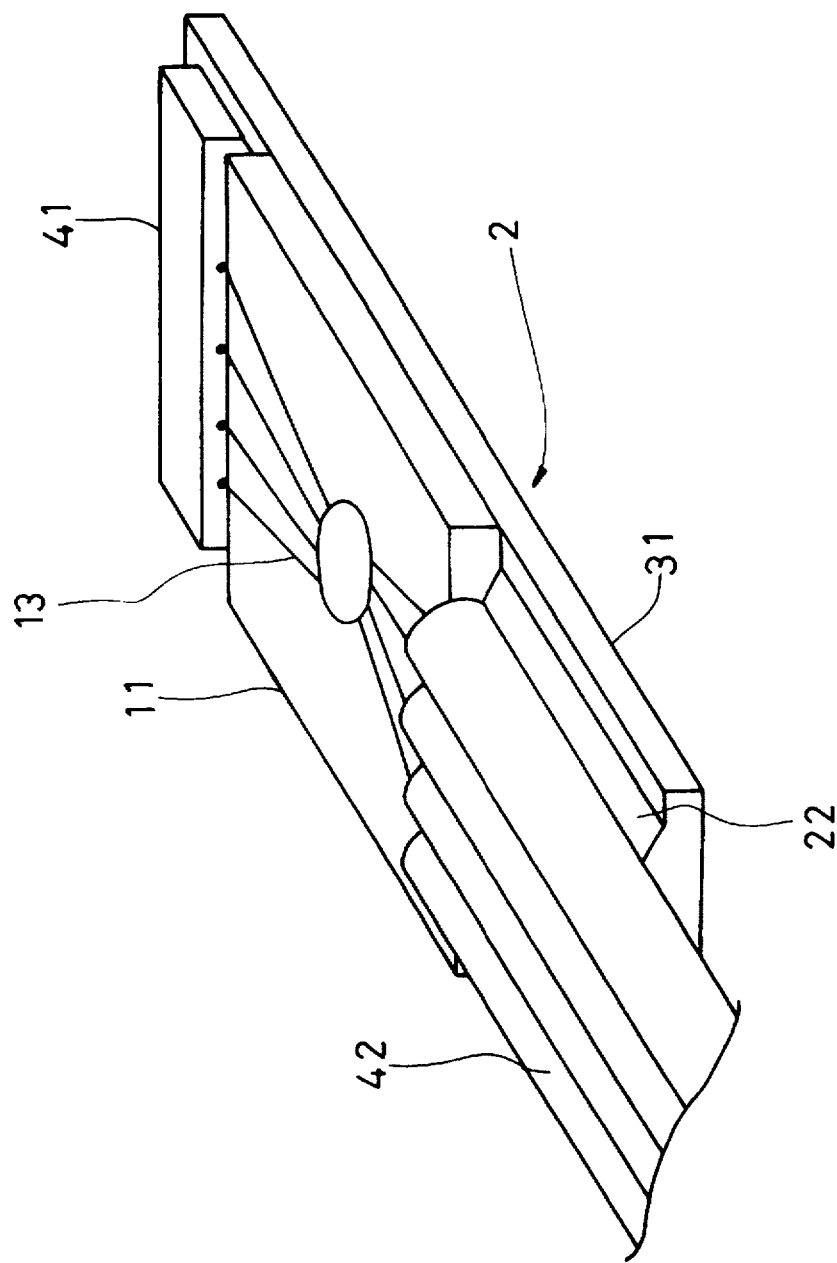
FIG. 7 is a perspective view showing a finished optical module of the second embodiment.

FIG. 7 shows the finished optical module 2 of the second embodiment serving as an optical transmitter. The optical module 2 further comprises a semiconductor laser array 41 and optical fibers 42 over the intermediate body 30 shown in FIG. 6. The semiconductor laser array 41 is mounted on the electric elements mounting surface 31a of the mounting substrate 31. The optical fibers 42 are arranged and held on the arranging guide grooves 22 of the mounting substrate 31. The pitch of the semiconductor laser array 41 coincides with the pitch of the optical waveguides 13 at the end faces 11a of the optical waveguide substrate 11. The pitch of the arranging guide grooves 22 coincides with the pitch of the optical waveguides 13. Thus, four output light beams from the semiconductor laser array 41 are multiplexed and branched by the optical waveguides 13, and coupled to four optical fibers 42 respectively. The light beams are coupled into the optical fibers 42.

The semiconductor laser array 41 may easily be mounted on the electric elements mounting surface 31a of the mounting substrate 31 by using the positioning marks 32. Thus, the optical module 2 shown in FIG. 7 can easily be assembled with a high accuracy without adjusting the positions of the semiconductor laser array 41 and the optical fibers 42.

In the second embodiment, the electric elements mounting surface 31a and the positioning marks 32 are formed on the mounting substrate. However, the configuration of the second embodiment is not restricted as shown in the figure. The electric elements mounting surface 31a and/or the positioning marks 32 can be formed on the optical waveguide substrate 11 or both of the optical waveguide substrate 11 and the mounting substrate 31.

Third Embodiment

A third preferred embodiment of an optical module and method for manufacturing the optical modules of this invention is described with reference to FIG. 8. The optical module 3 shown in FIG. 8 relates to an optical branching device for branching an input light beam to, for example, four light beams. The input light beam is transmitted through an input optical fiber 51 and enters the optical waveguides 13. The light beam is branched to four light beams by the optical waveguide 13 and respectively transmitted to different output optical fibers 52.

The configuration of the optical module 3 in the third embodiment is fundamentally the same as that in the first embodiment. However, the optical waveguide substrate 11 is divided into two portions of first and second optical waveguide substrates 11a and 11b. The first optical waveguide substrate 11a has a pattern of optical waveguides 131 for branching one light beam into two light beams. The second optical waveguide substrate 11b has two sets of patterns of the optical waveguides 132, 133 respectively for branching two sets of single light beams into two light beams.

Figure 8:
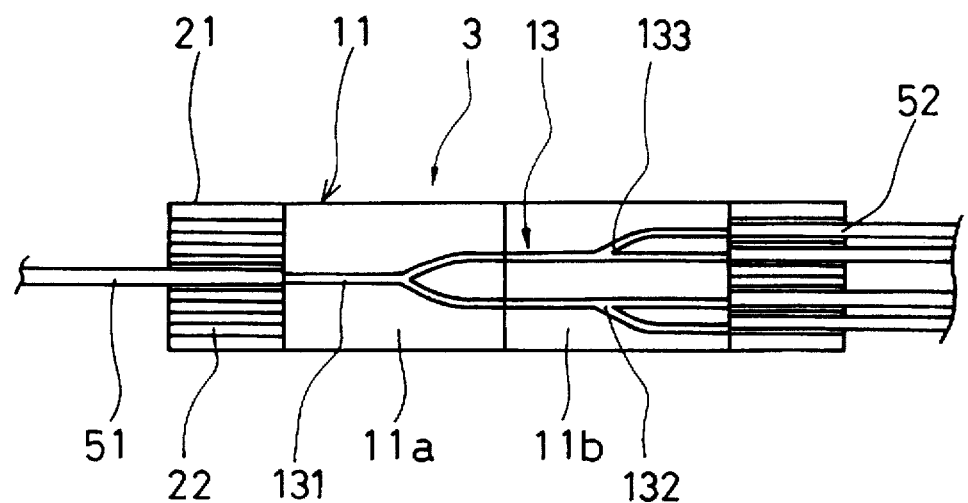
FIG. 8 is a plan view showing a finished optical module of a third embodiment of an optical module and method for manufacturing the optical modules of this invention.

As can be seen from FIG. 8, an input end of the optical waveguides 131 faces the input optical fiber 51. The the branched output ends of the optical waveguides 131 face input ends of the optical waveguides 132 and 133. The branched output ends of the optical waveguides face the output optical fibers 52. In other words, the centers of the optical waveguides 131, 132 and 133 are respectively positioned at the centers of the arranging guide grooves 22. Thus, the optical module 3 has the function of branching one light beam into four light beams.

Fourth Embodiment

A fourth preferred embodiment of an optical module and a method for manufacturing the optical modules of this invention is described with reference to FIG. 9. The optical module 4 shown in FIG. 9 relates to an optical multiplexer. In the optical module 4, three light beams $\lambda 1$, $\lambda 2$ and $\lambda 3$ respectively having different wavelengths, are respectively transmitted through different three input optical fibers 53a, 53b and 53c, and entered into a optical waveguide substrate 61. The optical beams $\lambda 1$, $\lambda 2$ and $\lambda 3$ are transmitted in the optical waveguides 13 and put out from, for example, one output optical fiber 54. The optical waveguide substrate 61 is divided into four portions of first, second, third and fourth optical waveguide substrates 61a, 61b, 61c and 61d. The first and fourth optical waveguide substrates 61a and 61d have substantially the same configuration. The first optical waveguide substrate 61a has two optical waveguides 13a and 13b which are connected at a junction 13d. Similarly, the fourth optical waveguide substrate 61d has two optical waveguides 13f and 13g which are connected at a junction 13h. The first optical waveguide substrate 61a and the fourth optical waveguide substrate 61d are respectively disposed in opposing directions parallel to the arrangement of the arranging guide grooves 22. The optical waveguides 13b and 13f are coupled. The second and third optical waveguides 61b and 61c have substantially the same configuration. The second optical waveguide substrate 61b has one straight optical waveguide 13c which is coupled to the optical waveguide 13g. The third optical waveguide substrate 61c has one straight optical waveguide 13e which is coupled the optical waveguide 13a.

The end faces of the input optical fibers 53a, 53b and 53c, which are arranged and fixed on the arranging guide grooves 22 of the optical fiber arranging substrate 21, are respectively coupled to end faces of the optical waveguides 13a, 13b and 13c. The light beams $\lambda 1$ and $\lambda 2$, which pass through the input optical fibers 53a and 53b, respectively move in the optical waveguides 13a and 13b and are multiplexed at the junction 13d of the first optical waveguide substrate 61a. The light beam $\lambda 3$ passing through the input optical fiber 53c moves in the optical waveguide 13c of the second optical waveguide substrate 61b and enters into the optical waveguide 13g of the fourth optical waveguide substrate 61d. The light beams $\lambda 1$ and $\lambda 2$, which are multiplexed in the first optical waveguide substrate 61a at the junction 13d and move in the optical waveguide 13b, enter into the optical waveguide 13f of the fourth optical waveguide substrate 61d. The light beams $\lambda 1$, $\lambda 2$ and $\lambda 3$ are multiplexed at the junction 13h and are output from the output optical fiber 54.

As mentioned above, the optical module having desired optical functions can be obtained by combination of different optical waveguide substrates 61a to 61d. In the above-mentioned fourth embodiment, the third optical waveguide substrate 61c is not necessary. Alternatively, the first and second optical waveguide substrates 61a and 61b, and the third and fourth optical waveguide substrates 61c and 61d are respectively integrally formed in one plate. Furthermore, the optical fiber arranging substrate 21 can be configured by plural members. Furthermore, it is not necessary for the width of the optical waveguide substrate 11 to coincide with the width of the optical fiber arranging substrate 21. Furthermore, it is preferable that the optical waveguide substrates 61a to 61d and the optical fiber arranging substrate 21 are produced by using dies, as in to the above-mentioned first embodiment.

Generally, when all the functional elements are integrated on an optical waveguide substrate, the size of the substrate will become larger and the mass-productivity will be reduced. However, according to the fourth embodiment of this invention, plural kinds of the optical waveguide substrates respectively having different functions such as optical multiplexer, optical branching device, and so on are previously manufactured. When the optical waveguide substrates are selectively combined corresponding to the desired functions, the optical module having the desired functions can be obtained without adjustment of the optical waveguides and the optical fibers. Thus, optical modules, having reduced optical losses, can be reduced, can be manufactured and supplied.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. An optical module comprising:
an optical waveguide substrate with optical waveguides formed on a first surface thereof and at least one positioning guide groove formed on a second surface opposing to said first surface; and
an optical fiber arranging substrate having arranging guide grooves formed on a surface thereof and engaged with said positioning guide groove of said optical waveguide substrate for arranging and holding optical fibers and coupling the optical fibers to said optical waveguides; wherein
a first pitch of said optical waveguides on end faces of said optical waveguide substrate coincides with a second pitch of said arranging guide grooves of said optical fiber arranging substrate.

2. The optical module according to claim 1, wherein said optical waveguide substrate has a first pattern of positioning guide grooves and said optical fiber arranging substrate has a second pattern of said arranging guide grooves, said first and second patterns each having a periodic repetition of a same groove shape with a first phase of the first pattern being different from a second phase of the second pattern by one-half of said second pitch of said arranging guide grooves.

3. The optical module according to claim 2, wherein said groove shape is selected to be one of V-shaped, arcuate, and rectangular.

4. An optical module comprising an optical waveguide substrate, at least one optical fiber and an optical fiber arranging substrate having at least one arranging guide groove for arranging and holding said optical fiber, wherein at least one positioning guide groove is formed on said optical waveguide substrate for positioning said optical waveguide substrate on said optical fiber arranging substrate.

5. The optical module according to claim 4, wherein said optical waveguide substrate is divided into a plurality of portions, and a first pattern of optical waveguides in a first one of said portions is different from a second pattern of optical waveguides in a second one of said portions.

6. The optical module according to claim 5, wherein at least one of said two or more portions has a coupling part for coupling at least two optical waveguides.

7. The optical module according to claim 4, wherein said optical waveguide is divided into a plurality of portions, said optical waveguide having patterns in a first one of said portions and a second one of said portions substantially the same, said first one of said portions and said second one of said portions being connected in opposite directions.

8. The optical module according to claim 7, wherein at least one of said two or more portions has a coupling part for coupling at least two optical waveguides.

9. The optical module according to claim 4, wherein a first pitch of said optical waveguides on end faces of said optical waveguide substrate coincides with a second pitch of said arranging guide grooves of said optical fiber arranging substrate.

10. An optical module comprising an optical waveguide substrate, at least one optical fiber, at least one electric element and an optical fiber arranging substrate having at least one arranging guide groove on a first surface for arranging and fixing said optical fiber, wherein
at least one positioning guide groove is formed on said optical waveguide substrate by which said optical waveguide substrate is positioned on said optical fiber arranging substrate, and at least one positioning mark, by which said electric element is mounted, is formed on at least one of said optical waveguide substrate and said optical fiber arranging substrate.

11. The optical module according to claim 10, wherein said optical fiber arranging substrate has a mounting surface on said first surface, on which said electric element is mounted, and said positioning mark is selected to have a convex shape, a concave shape, or a combination of convex and concave shapes on said mounting surface.

12. The optical module according to claim 10, wherein said optical waveguide substrate is divided into a plurality of portions, and a first pattern of optical waveguides in a first one of said portions is different from a second pattern of optical waveguides in a second one of said portions.

13. The optical module according to claim 12, wherein at least one of said two or more portions has a coupling part for coupling at least two optical waveguides.

14. The optical module according to claim 10, wherein said optical waveguide is divided into a plurality of portions, said optical waveguide having patterns in a first one of said portions and a second one of said portions substantially the same, said first one of said portions and said second one of said portions being connected in opposite directions.

15. The optical module according to claim 14, wherein at least one of said two or more portions has a coupling part for coupling at least two optical waveguides.

16. The optical module according to claim 10, wherein a first pitch of said optical waveguides on end faces of said optical waveguide substrate coincides with a second pitch of the arranging guide grooves of said optical fiber arranging substrate.

17. A method for manufacturing optical modules comprising the steps of:

forming at least one positioning guide groove on a first surface of an optical waveguide substrate;

forming optical waveguides for effecting predetermined functions on a second surface opposing to said first surface of said optical waveguide substrate;

forming arranging guide grooves, with which said positioning groove of said optical waveguide substrate is engaged and on which optical fibers are arranged and fixed, on a surface of an optical fiber arranging substrate; and fixing said optical waveguide substrate on said optical fiber arranging substrate; wherein a first pitch of said optical waveguides on end faces of said optical waveguide substrate coincides with a second pitch of said arranging guide grooves of said optical fiber arranging substrate.

18. The method for manufacturing optical modules according to claim 17, wherein at least one positioning mark, used for mounting at least one electric element, is formed on at least one of said optical waveguide substrate and said optical fiber arranging substrate.

19. The method for manufacturing optical modules according to claim 17, wherein said optical waveguide substrate is divided into a plurality of portions, and a first pattern of optical waveguides in a first one of said portions is different from a second pattern of optical waveguides in a second one of said portions.

20. The method for manufacturing optical modules according to claim 19, wherein at least one of said two or more portions has a coupling part for coupling at least two optical waveguides.

21. The method for manufacturing optical modules according to claim 17, wherein said optical waveguide is divided into a plurality of portions, said optical waveguide having patterns in a first one of said portions and a second one of said portions substantially the same, said first one of said portions and said second one of said portions being connected in opposite directions.

22. The method for manufacturing optical modules according to claim 21, wherein at least one of said two or more portions has a coupling part for coupling at least two optical waveguides.

* * * * *